United States Patent
Khan et al.

(10) Patent No.: US 12,500,665 B2
(45) Date of Patent: Dec. 16, 2025

(54) SYSTEM AND METHOD FOR TRAFFIC DISTRIBUTION WITH OPTICAL SWITCH

(71) Applicants: RAKUTEN MOBILE, INC., Tokyo (JP); Rakuten Symphony, Inc., Tokyo (JP)

(72) Inventors: Parvez Khan, Tewksbury, MA (US); Nirav Salot, Bangalore (IN); Vinay Vij, Gurgaon (IN); Praveen Konath, Bengaluru (IN)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 392 days.

(21) Appl. No.: 17/909,224

(22) PCT Filed: Aug. 5, 2022

(86) PCT No.: PCT/US2022/039547
§ 371 (c)(1),
(2) Date: Sep. 2, 2022

(87) PCT Pub. No.: WO2024/030135
PCT Pub. Date: Feb. 8, 2024

(65) Prior Publication Data
US 2024/0223273 A1 Jul. 4, 2024

(51) Int. Cl.
*H04B 10/038* (2013.01)
*H04B 10/80* (2013.01)
(Continued)

(52) U.S. Cl.
CPC ........... *H04B 10/038* (2013.01); *H04B 10/80* (2013.01); *H04B 10/03* (2013.01); *H04B 10/032* (2013.01);
(Continued)

(58) Field of Classification Search
CPC ...... H04B 10/038; H04B 10/08; H04B 10/80; H04B 10/03; H04B 10/032;
(Continued)

(56) References Cited

U.S. PATENT DOCUMENTS 5,461,608 A * 10/1995 Yoshiyama ............. H04J 3/085
709/251
5,781,528 A 7/1998 Sato et al.
(Continued)

OTHER PUBLICATIONS

Black Box Network Services (BBNS), T3 E3 Fiber Optic Line Drivers, Jan. 2004, All Document. http://www2.blackboxab.se/Manualer/M/MT/MT618A-ST-R3.pdf (Year: 2004).*
(Continued)

*Primary Examiner* — Dibson J Sanchez
(74) *Attorney, Agent, or Firm* — Sughrue Mion, PLLC

(57) ABSTRACT

A computer-implemented method of distributing traffic includes distributing, to a first distributed unit (DU), traffic via a first path, receiving, from the first DU, an indication generated by a first dry contact alarm of the first DU that a state has changed in the first DU, switching, by an optical switch, the traffic from the first path to a second path based on the indication from the first DU, and distributing, to a second DU, the traffic via the second path.

16 Claims, 4 Drawing Sheets

(51) Int. Cl.
 *H04B 10/03* (2013.01)
 *H04B 10/032* (2013.01)
 *H04Q 11/00* (2006.01)

(52) U.S. Cl.
 CPC ...... *H04Q 11/0001* (2013.01); *H04Q 11/0005* (2013.01); *H04Q 2011/0043* (2013.01)

(58) Field of Classification Search
 CPC ........... H04Q 11/0001; H04Q 11/0005; H04Q 2011/0043; H04L 45/22
 USPC ............................................ 398/1–8, 43–103
 See application file for complete search history.

(56) References Cited

U.S. PATENT DOCUMENTS

| | | | | |
|---|---|---|---|---|
| 6,226,268 | B1* | 5/2001 | Kunikyo | H04Q 11/0478 370/440 |
| 6,654,923 | B1* | 11/2003 | Grenier | H04Q 11/0478 370/216 |
| 6,775,228 | B1* | 8/2004 | Solana De Quesada | H04L 49/405 370/225 |
| 7,945,817 | B1 | 5/2011 | Usery et al. | |
| 8,755,686 | B2 | 6/2014 | Fu | |
| 2003/0180047 | A1* | 9/2003 | Way | H04L 12/437 398/59 |
| 2004/0076431 | A1* | 4/2004 | Mueller | H04J 14/0294 398/33 |
| 2004/0136644 | A1* | 7/2004 | Fouquet | G02B 6/3582 385/18 |
| 2005/0185954 | A1* | 8/2005 | Sadananda | H04J 14/0227 398/5 |
| 2007/0009261 | A1* | 1/2007 | Nielsen | H04Q 11/0005 398/45 |
| 2007/0264009 | A1* | 11/2007 | Sabat, Jr. | H04B 10/25752 398/5 |
| 2008/0037988 | A1* | 2/2008 | Bullock | H04J 14/0241 370/440 |
| 2009/0147672 | A1* | 6/2009 | Chun | H04L 12/437 370/225 |
| 2009/0310960 | A1* | 12/2009 | Xu | H04J 14/0295 398/4 |
| 2012/0011390 | A1* | 1/2012 | Wu | H04Q 11/0062 714/E11.073 |
| 2012/0263452 | A1* | 10/2012 | Shirai | H04L 12/437 398/3 |
| 2013/0121683 | A1* | 5/2013 | Nagamine | H04L 41/0677 398/2 |
| 2013/0216216 | A1 | 8/2013 | Bottari et al. | |
| 2016/0112303 | A1* | 4/2016 | Yoo | H04L 45/24 398/45 |
| 2017/0366255 | A1* | 12/2017 | Sharma | H04B 10/032 |
| 2020/0059712 | A1* | 2/2020 | Satyarthi | H04J 14/0212 |
| 2020/0106519 | A1* | 4/2020 | Polehn | H04B 10/0795 |

OTHER PUBLICATIONS

International Search Report dated Nov. 21, 2022 issued by the International Searching Authority in Application No. PCT/US22/39547.
Written Opinion dated Nov. 21, 2022 issued by the International Searching Authority in Application No. PCT/US22/39547.

* cited by examiner

SYSTEM AND METHOD FOR TRAFFIC DISTRIBUTION WITH OPTICAL SWITCH

CROSS REFERENCE TO RELATED APPLICATIONS

This application is a National Stage of International Application No. PCT/US2022/039547 filed Aug. 5, 2022.

BACKGROUND

1. Field

Apparatuses and methods consistent with example embodiments of the present disclosure relate to traffic distribution with an optical switch.

2. Description of Related Art

In a system including a base station using multiple distributed units (DUs) distributing a traffic flow in series, a single point of failure along any of the DUs may cause the entire traffic flow to be interrupted.

SUMMARY

According to embodiments, systems and methods are provided for distributing traffic.

According to an aspect of the disclosure, a computer-implemented method of distributing traffic may include distributing, to a first distributed unit (DU), traffic via a first path, receiving, from the first DU, an indication generated by a first dry contact alarm of the first DU that a state has changed in the first DU, switching, by an optical switch, the traffic from the first path to a second path based on the indication from the first DU, and distributing, to a second DU, the traffic via the second path.

According to an aspect of the disclosure, a system for distributing traffic may include a first DU, a second DU, an optical switch, and a processor configured to distribute, to the first DU, traffic via a first path, receive, from the first DU, an indication generated by a first dry contact alarm of the first DU that a state has changed in the first DU, switch, by the optical switch, the traffic from the first path to a second path based on the indication from the first DU, and distribute, to the second DU, the traffic via the second path.

According to an aspect of the disclosure, a non-transitory computer-readable storage medium may store instructions that, when executed by at least one processor, cause the at least one processor to distribute, to a first DU, traffic via a first path, receive, from the first DU, an indication generated by a first dry contact alarm of the first DU that a state has changed in the first DU, switch, by an optical switch, the traffic from the first path to a second path based on the indication from the first DU, and distribute, to a second DU, the traffic via the second path.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
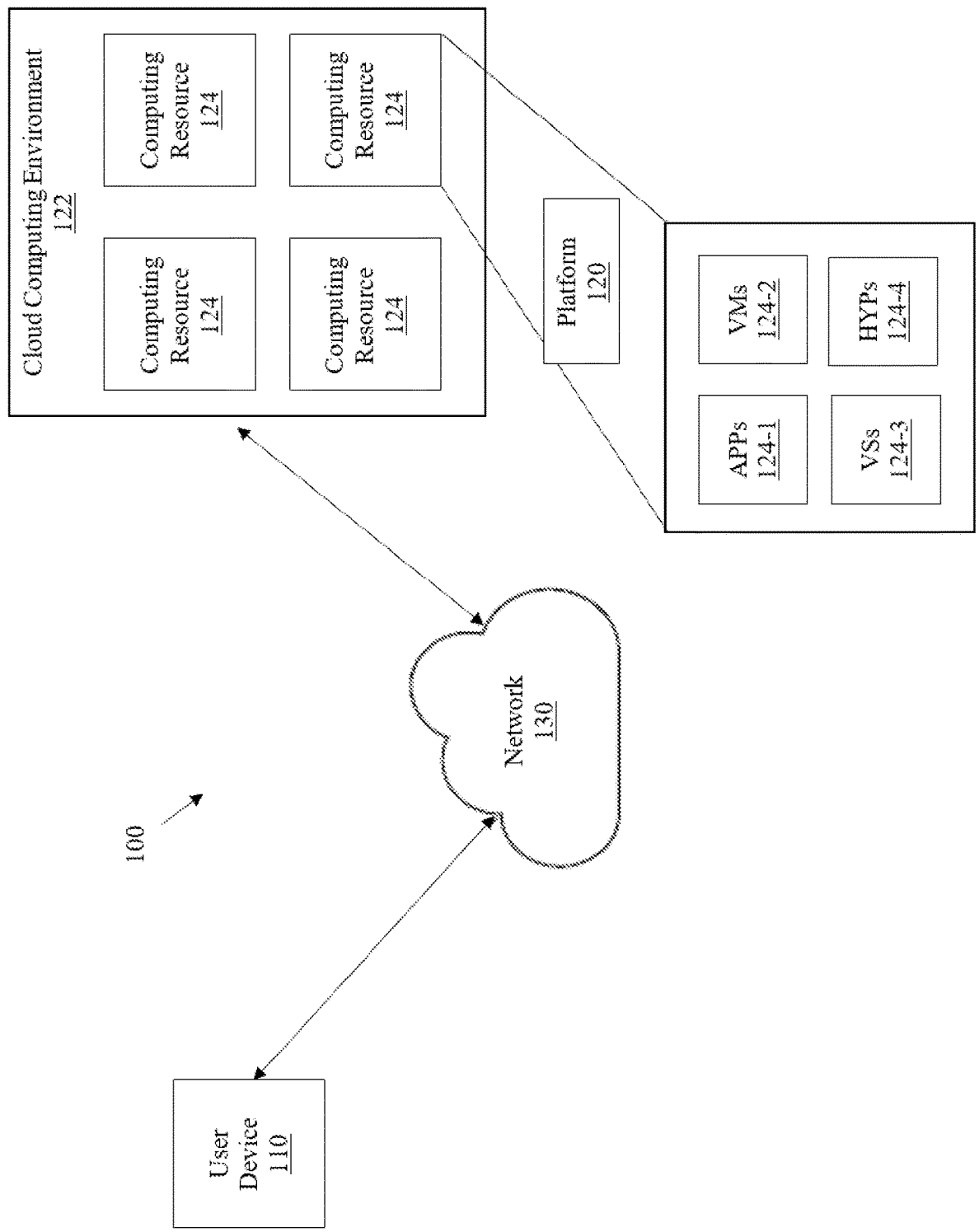
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
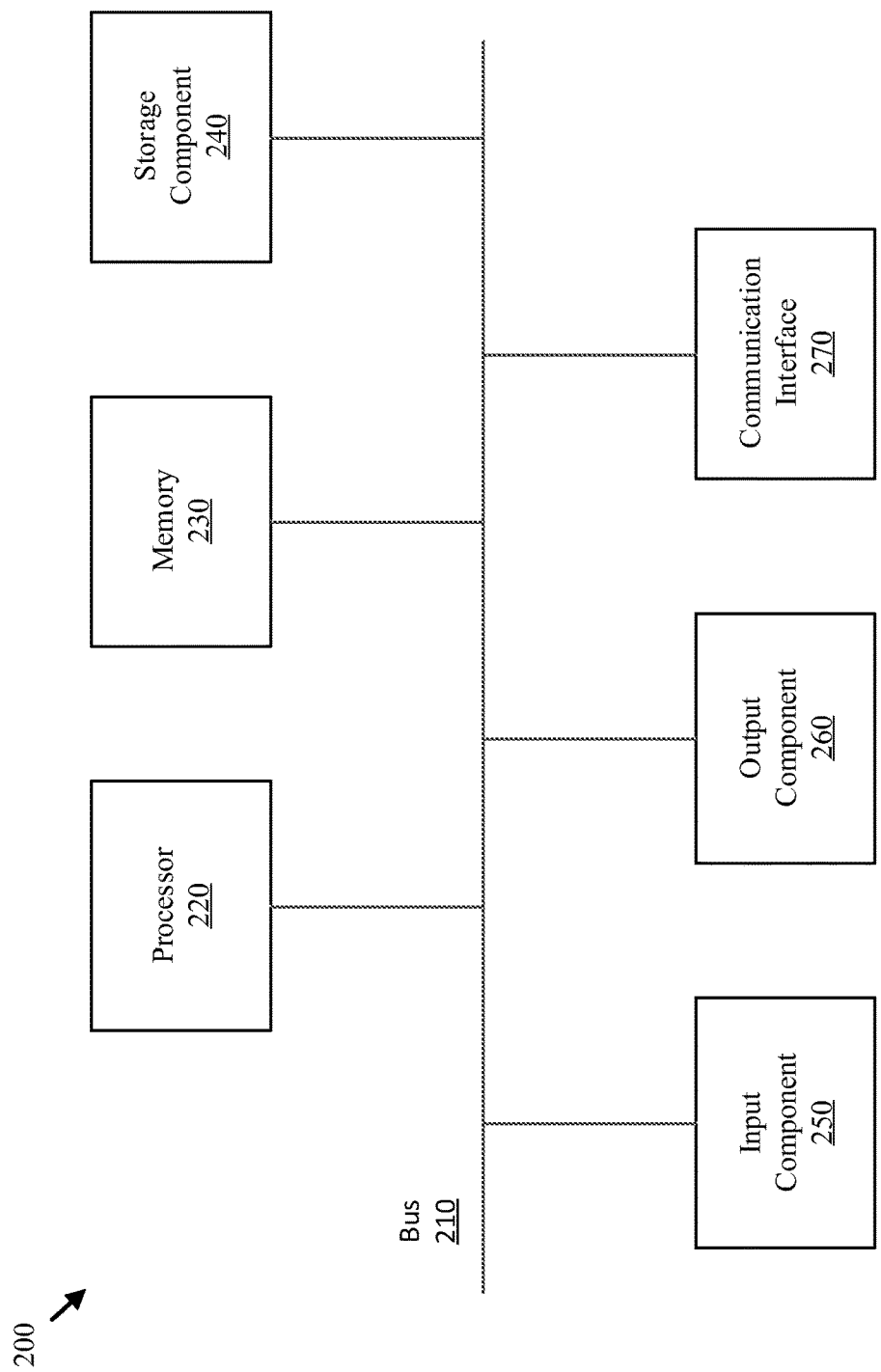
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Provided is a system and method for distributing traffic among multiple distributed units (DUs). In a traffic flow scenario where traffic (i.e., data) is distributed from an optical switch to a first DU and then a second DU from the first DU, when a fault occurs in the first DU, the traffic flow is disrupted to the second DU. Thus, as provided herein, the first DU may generate an indication (e.g., via a dry-contact alarm) when a change in state (e.g., a software fault) occurs in the first DU. The indication may be received by an optical switch, which may then be configured to switch the traffic flow from the first DU to the second DU. The optical switch may send an alarm (e.g., a dry-contact alarm) to the second DU as an indication of the change in traffic flow as well as an indication as to the fault state of the first DU.

As used herein, a dry contact alarm may be implemented as a dry contact switch that may be triggered to transition between an open state and a closed state, providing indications as to the status of the system.

Figure 3:
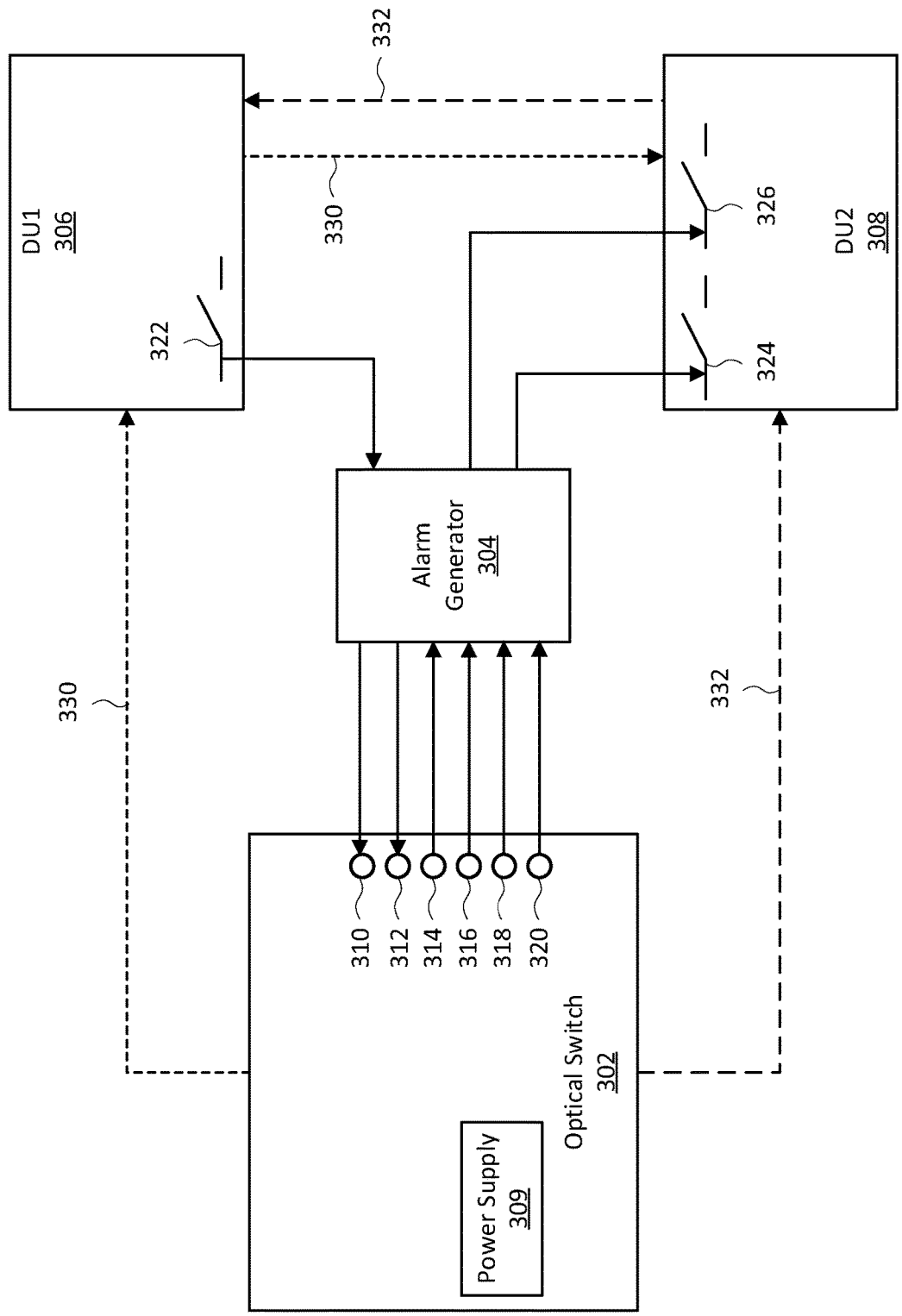
FIG. 3 is a diagram of a system for distributing traffic, according to an embodiment.

FIG. 3 is a diagram of a system for distributing traffic, according to an embodiment. The system may include an optical switch 302, an alarm generator 304, a first DU (DU1) 306 and a second DU (DU2) 308. The optical switch 302 may include a power supply 309 (alternatively or additionally, a power supply may be provided external to the optical switch 302), as well as a first pin 310, a second pin 312, a third pin 314, a fourth pin 316, a fifth pin 318 and a sixth pin 320. Each of the pins 310-320 may correspond to individual dry contact alarms/switches as is described below. DU1 306 may include a dry contact alarm 322. DU2 308 may include a first dry contact alarm 324 and a second dry contact alarm 326. Although dry contact alarms 322-326 are depicted in an open state, this is merely for illustrative purposes, and the various open/closed states of the dry contact alarms 322-326 will be described in detail below. The system may include a first traffic flow 330 from the optical switch 302, to DU1 306 and then to DU2 308. The system may include a second traffic flow 332 from the optical switch 302 to DU2 308 and then to DU1 306. In some embodiments, the second traffic flow 332 does not flow to DU1 306.

While operating with the first traffic flow 330, the dry contact alarm 322 may be in a closed state, indicating that a state of DU1 306 is a functional state. When a fault occurs in DU1 306 (e.g., a software fault, a power disruption, a signal error, etc.), the dry contact alarm 322 may switch to an open state, providing an indication that a state of DU1 306 has changed from a functional state to a non-functional state. The dry contact alarm 322 may generate a signal that is received from the alarm generator 304, and the alarm generator 304 may be configured to generate a signal (i.e., an alarm) based on the signal received from the dry contact alarm 322 to be sent to the optical switch 302. The optical switch 302 may receive the signal from the alarm generator 304 as an input to the first pin 310 and the second pin 312 (i.e., the first pin 310 and the second pin 312 may correspond to the state of DU1 306).

The input to the first pin 310 and the second pin 312 may cause the pins 310 and 312 to open, indicating to the optical switch 302 of the change in state of DU1 306 (i.e., that DU1 306 is in a non-functional state). In response to the pins 310 and 312 opening, the optical switch 302 may switch the traffic from the first traffic flow 330 to the second traffic flow 332 such that traffic is flowing to DU2 308 first. Furthermore, the optical switch 302 may close pin 314 and pin 316 to generate an alarm to be sent to the alarm generator 304. Based on pins 314 and 316 closing, the alarm generator 304 may generate an alarm signal to be sent to the dry contact alarm 326 of DU2, moving the dry contact alarm 326 to closed state (alternative open/close states will be understood by one of ordinary skill in the art from the disclosure herein). Based on the dry contact alarm 326 moving to the closed state, DU2 308 may generate a signal to be sent to a central server device notifying of the non-functional state of DU1 306. Further, the closed status of the dry contact alarm 326 may indicate the system error to a technician observing the system. Thus, pins 314 and 316 may correspond to DU2.

When the state of DU1 changes from the non-functional state to the functional state, the dry contact alarm 322 may move to an open state, generating a signal (or discontinuing a signal) to the alarm generator 304, which may generate a signal to the optical switch 302 to close pins 310 and 312, and open pins 314 and 316. In response, the optical switch 302 may switch the traffic from the second traffic flow 332 to the first traffic flow 330.

Pins 318 and 320 may correspond to the power supply 309. That is, when the power supply 309 that is supplying power to the optical switch 302 encounters an error or fault in supplying power, the optical switch 302 may switch the traffic flow from the first traffic flow 330 to the second traffic flow 332 (i.e., opening pins 310 and 312 while closing pins 314 and 316) and then close pins 318 and 320. Closing pins 318 and 320 may generate a signal to the alarm generator 304 to transmit a signal to the dry contact alarm 324, closing the dry contact alarm 324.

Therefore, by switching the traffic to the second traffic flow 332 in response to a fault in the power supply 309, the system provides indications to a technician or other observer as to the status of the system. For example, if the dry contact alarm 324 is open and the dry contact alarm 326 is closed, it indicates that there is a fault on DU1 306. If the dry contact alarm 324 is closed and the dry contact alarm 326 is closed, it indicates that there is a fault on the power supply 309. Similarly, if pins 310 and 312 are open, pins 314 and 316 are closed, and pins 318 and 320 are open, it means that there is a fault on DU1 306. If pins 310 and 312 are open, pins 314 and 316 are closed, and pins 318 and 320 are closed, it means that there is a fault on the power supply 309.

Table 1 shows various states of the system. "O" refers to an open state and "C" refers to a closed state.

TABLE 1

| Status | Alarm 322 | Alarm 324 | Alarm 326 | Pins 310 and 312 | Pins 314 and 316 | Pins 318 and 320 |
|---|---|---|---|---|---|---|
| No Fault | C | O | O | C | O | O |
| Fault on DU1 306 | O | O | C | O | C | O |
| Fault on Power Supply 309 | O/C | C | C | O | C | C |

Figure 4:
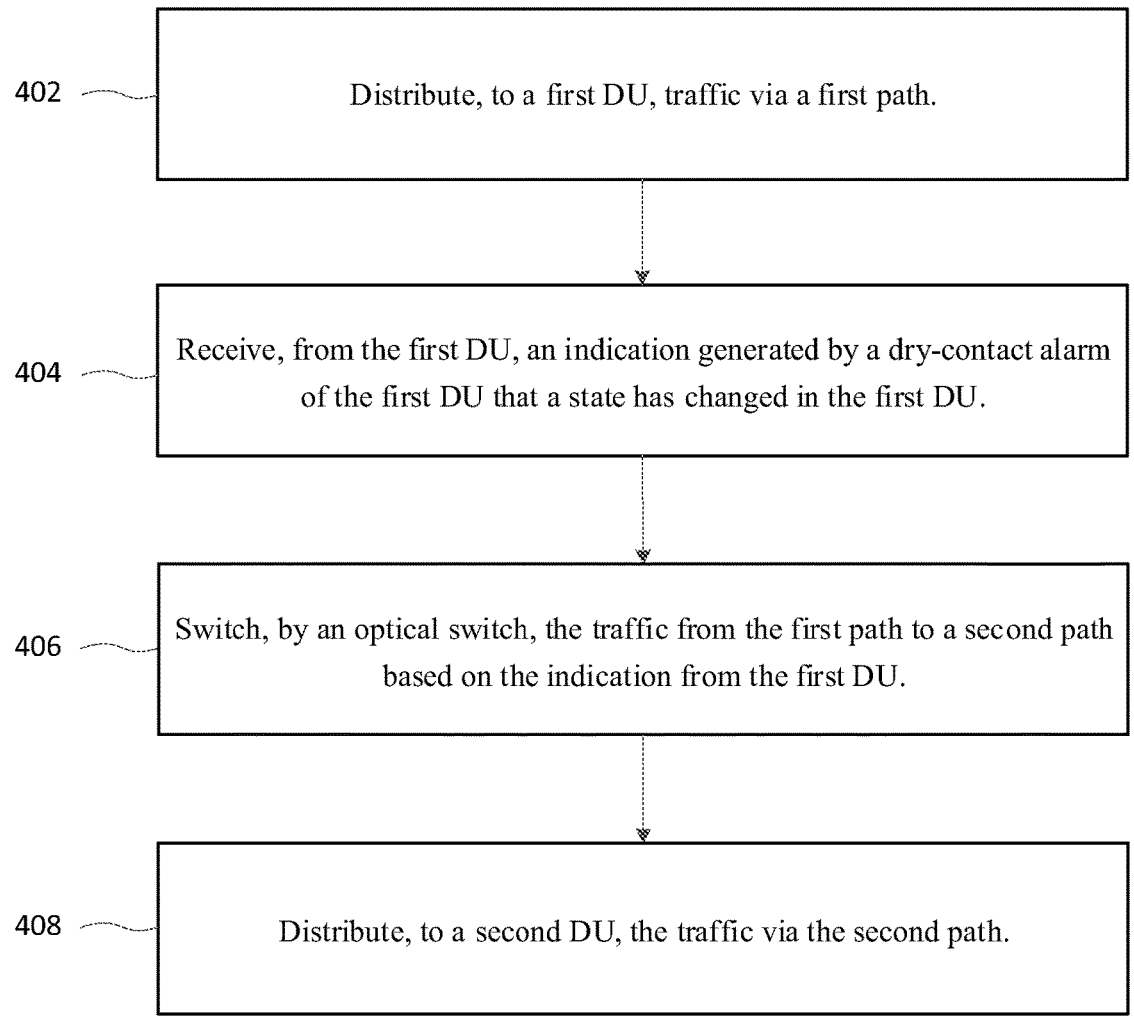
FIG. 4 is a flowchart of a method of distributing traffic, according to an embodiment.

FIG. 4 is a flowchart of a method of distributing traffic, according to an embodiment. In operation 402, the system distribute, to a first DU, traffic via a first path. In operation 404, the system may receive, from the first DU, an indication generated by a dry contact alarm of the first DU that a state has changed in the first DU. In operation 406, the system may switch, by an optical switch, the traffic from the first path to a second path based on the indication from the first DU. In operation 408, the system may distribute, to a second DU, the traffic via the second path.

In embodiments, any one of the operations or processes of FIGS. 3-4 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A computer-implemented method of distributing traffic, comprising:
    distributing, to a first distributed unit (DU), traffic via a first path;
    receiving, from the first DU, an indication generated by a first dry contact alarm of the first DU that a state has changed in the first DU;
    switching, by an optical switch, the traffic from the first path to a second path based on the indication from the first DU, wherein the switched traffic does not flow to the first DU; and
    distributing, to a second DU, the traffic via the second path,
    wherein the method further comprises:
    in response to receiving the indication that the state has changed in the first DU, sending, from the optical switch, an alarm to the second DU indicating that the state has changed in the first DU; and
    transmitting, from the second DU to a server device, the alarm indicating that the state has changed in the first DU.

2. The method of claim 1, wherein the indication that the state has changed in the first DU comprises an input alarm received by the optical switch from the first DU.

3. The method of claim 1, wherein the optical switch comprises a second dry contact alarm.

4. The method of claim 3, further comprising, in response to receiving the indication that the state has changed in the first DU, opening first pins of the optical switch corresponding to the first DU.

5. The method of claim 4, further comprising, in response to receiving the indication that the state has changed in the first DU, closing second pins of the optical switch that are different from the first pins, the second pins corresponding to the second DU.

6. The method of claim 5, further comprising, in response to the second pins being closed, transmitting, from the second DU to a server device, an alarm indicating that the state has changed in the first DU.

7. The method of claim 1, wherein the first path comprises traffic flow from the optical switch to the first DU, and from the first DU to the second DU, and
wherein the second path comprises traffic flow from the optical switch to the second DU.

8. A system for distributing traffic, comprising:
a first distributed unit (DU);
a second DU;
an optical switch; and
at least one processor configured to:
distribute, to the first DU, traffic via a first path;
receive, from the first DU, an indication generated by a first dry contact alarm of the first DU that a state has changed in the first DU;
switch, by the optical switch, the traffic from the first path to a second path based on the indication from the first DU, wherein the switched traffic does not flow to the first DU; and
distribute, to the second DU, the traffic via the second path,
wherein the processor is further configured to:
in response to receiving the indication that the state has changed in the first DU, send, from the optical switch, an alarm to the second DU indicating that the state has changed in the first DU; and
transmit, from the second DU to a server device, the alarm indicating that the state has changed in the first DU.

9. The system of claim 8, wherein the indication that the state has changed in the first DU comprises an input alarm received by the optical switch from the first DU.

10. The system of claim 8, wherein the optical switch comprises a second dry contact alarm.

11. The system of claim 8, wherein the at least one processor is further configured to, in response to receiving the indication that the state has changed in the first DU, open first pins of the optical switch corresponding to the first DU.

12. The system of claim 11, wherein the at least one processor is further configured to, in response to receiving the indication that the state has changed in the first DU, close second pins of the optical switch that are different from the first pins, the second pins corresponding to the second DU.

13. The system of claim 12, wherein the at least one processor is further configured to, in response to the second pins being closed, transmit, from the second DU to a server device, an alarm indicating that the state has changed in the first DU.

14. The system of claim 8, wherein the first path comprises traffic flow from the optical switch to the first DU, and from the first DU to the second DU, and
wherein the second path comprises traffic flow from the optical switch to the second DU.

15. A non-transitory computer-readable storage medium storing instructions that, when executed by at least one processor, cause the at least one processor to:
distribute, to a first distributed unit (DU), traffic via a first path;
receive, from the first DU, an indication generated by a first dry contact alarm of the first DU that a state has changed in the first DU;
switch, by an optical switch, the traffic from the first path to a second path based on the indication from the first DU, wherein the switched traffic does not flow to the first DU; and
distribute, to a second DU, the traffic via the second path,
wherein the instructions, when executed, further cause the at least one processor to,
in response to receiving the indication that the state has changed in the first DU, sending, from the optical switch, an alarm to the second DU indicating that the state has changed in the first DU; and
transmitting, from the second DU to a server device, the alarm indicating that the state has changed in the first DU.

16. The storage medium of claim 15, wherein the indication that the state has changed in the first DU comprises an input alarm received by the optical switch from the first DU.

* * * * *